US012436547B2

(12) United States Patent
Jin et al.

(10) Patent No.: US 12,436,547 B2
(45) Date of Patent: Oct. 7, 2025

(54) GAS SUPPLY APPARATUS FOR SUBSTRATE PROCESSING APPARATUS

(71) Applicant: JUSUNG ENGINEERING CO., LTD., Gwangju-si (KR)

(72) Inventors: Se Whan Jin, Gwangju-si (KR); Jae Sung Roh, Gwangju-si (KR); Hong Min Yoon, Gwangju-si (KR); Hong Soo Yoon, Gwangju-si (KR); Youn Joo Jang, Gwangju-si (KR); Byoung Ha Cho, Gwangju-si (KR); Ji Hyun Cho, Gwangju-si (KR); Chul Joo Hwang, Gwangju-si (KR)

(73) Assignee: JUSUNG ENGINEERING CO., LTD. (KR)

( * ) Notice: Subject to any disclaimer, the term of this patent is extended or adjusted under 35 U.S.C. 154(b) by 83 days.

(21) Appl. No.: 18/269,202

(22) PCT Filed: Jan. 12, 2022

(86) PCT No.: PCT/KR2022/000513
§ 371 (c)(1),
(2) Date: Jun. 22, 2023

(87) PCT Pub. No.: WO2022/164082
PCT Pub. Date: Aug. 4, 2022

(65) Prior Publication Data
US 2024/0045453 A1 Feb. 8, 2024

(30) Foreign Application Priority Data
Jan. 27, 2021 (KR) .................. 10-2021-0011316

(51) Int. Cl.
*G05D 7/06* (2006.01)
(52) U.S. Cl.
CPC .................. *G05D 7/0617* (2013.01)

(58) Field of Classification Search
CPC .................................................. G05D 7/0617
See application file for complete search history.

(56) References Cited

U.S. PATENT DOCUMENTS 5,660,472 A * 8/1997 Peuse ...................... G01J 5/041
374/126
5,755,511 A * 5/1998 Peuse .................... G01J 5/0003
374/2

(Continued)

FOREIGN PATENT DOCUMENTS

JP      H0786189 A      3/1995
JP      H07240375 A     9/1995

(Continued)

OTHER PUBLICATIONS

International Search Report for PCT/KR2022/000513, mailed Apr. 18, 2022.

*Primary Examiner* — Michael R Reid
(74) *Attorney, Agent, or Firm* — Renaissance IP Law Group LLP

(57) ABSTRACT

The present inventive concept relates to a gas supply apparatus for a substrate processing apparatus, the gas supply apparatus comprising: a first supply line connected to a first gas spray unit; a plurality of first gas supply devices connected to the first supply line; a first measurement device measuring a first pressure at the first supply line; a second supply line connected to a second gas spray unit; a plurality of second gas supply devices connected to the second supply line; and a second measurement device measuring a second pressure at the second supply line, wherein the first measurement device checks if the first pressure deviates from a first reference value, and the second measurement device checks if the second pressure deviates from a second reference value.

11 Claims, 3 Drawing Sheets

(56) References Cited

U.S. PATENT DOCUMENTS

| | | | | |
|---|---|---|---|---|
| 6,179,466 | B1* | 1/2001 | Peuse | G01J 5/0846 |
| | | | | 374/2 |
| 7,391,098 | B2* | 6/2008 | Hwang | H01L 29/7848 |
| | | | | 257/E21.093 |
| 7,887,637 | B2* | 2/2011 | Ozaki | H01J 37/32862 |
| | | | | 134/1.1 |
| 8,183,158 | B2* | 5/2012 | Tomita | C23C 16/4405 |
| | | | | 257/E21.224 |
| 2006/0214593 | A1* | 9/2006 | Denpoh | H05H 1/0081 |
| | | | | 315/111.81 |
| 2008/0093023 | A1* | 4/2008 | Tomita | C23C 16/4405 |
| | | | | 118/712 |
| 2010/0159640 | A1* | 6/2010 | Park | C23C 16/407 |
| | | | | 257/E21.462 |
| 2011/0117682 | A1* | 5/2011 | Nam | H01L 21/67069 |
| | | | | 438/10 |
| 2016/0060762 | A1* | 3/2016 | Matsuo | C23C 16/52 |
| | | | | 438/758 |
| 2018/0012735 | A1 | 1/2018 | Sawachi et al. | |

FOREIGN PATENT DOCUMENTS

| | | |
|---|---|---|
| JP | 2011233841 A | 11/2011 |
| JP | 2012164990 A | 8/2012 |
| JP | 2015231626 A | 12/2015 |
| JP | 2017059199 A | 3/2017 |
| KR | 20050076287 A | 7/2005 |
| KR | 20070047487 A | 5/2007 |
| KR | 20080035485 A | 4/2008 |
| KR | 20130078815 A | 7/2013 |
| KR | 101563635 B1 | 10/2015 |
| KR | 20160110586 A | 9/2016 |
| KR | 20190012033 A | 2/2019 |
| KR | 102040641 B1 | 11/2019 |
| WO | 2013125387 A1 | 8/2013 |

* cited by examiner

GAS SUPPLY APPARATUS FOR SUBSTRATE PROCESSING APPARATUS

TECHNICAL FIELD

The present inventive concept relates to a substrate processing apparatus which performs a processing process such as a deposition process and an etching process on a substrate.

BACKGROUND ART

Generally, a thin-film layer, a thin-film circuit pattern, or an optical pattern should be formed on a substrate for manufacturing a solar cell, a semiconductor device, a flat panel display device, etc. To this end, a processing process is performed on a substrate, and examples of the processing process include a deposition process of depositing a thin film including a specific material on the substrate, a photo process of selectively exposing a portion of a thin film by using a photosensitive material, an etching process of removing the selectively exposed portion of the thin film to form a pattern, etc.

Such a processing process is performed on a substrate by a substrate processing apparatus. The substrate processing apparatus performs a processing process on the substrate by using a gas supplied from a gas supply apparatus.

FIG. 1 is a schematic block diagram of a gas supply apparatus according to the related art.

Referring to FIG. 1, a gas supply apparatus 100 according to the related art includes a first supply line 110 which is connected to a substrate processing apparatus 200, a first gas supply module 120 which is connected to the first supply line 110, a second supply line 130 which is connected to the substrate processing apparatus 200, and a second gas supply module 140 which is connected to the second supply line 130.

The second gas supply module 140 and the first gas supply module 120 are connected to each other. Therefore, the second gas supply module 140 and the first gas supply module 120 are connected in a parallel structure with respect to the substrate processing apparatus 200.

In this case, even when a breakdown occurs or an abnormal operation occurs in one of the second gas supply module 140 and the first gas supply module 120, the supply of a gas to the substrate processing apparatus 200 is continuously performed through the other, which normally operates, of the second gas supply module 140 and the first gas supply module 120.

Therefore, when the processing process is being performed, the gas supply apparatus 100 according to the related art is difficult to check a breakdown or an abnormal operation occurring in one of the second gas supply module 140 and the first gas supply module 120 and checks a quality test of a substrate after the processing process is completed, and due to this, there is a problem where damage and loss increase.

DISCLOSURE

Technical Problem

The present inventive concept is devised to solve the above-described problem and is for providing a gas supply apparatus for substrate processing apparatus, which may check a breakdown or an abnormal operation occurring in a gas supply module.

Technical Solution

To accomplish the above-described objects, the present inventive concept may include the following elements.

A gas supply apparatus for substrate processing apparatus according to the present inventive concept may include: a first gas supply unit for supplying a gas to a first gas injection unit; and a second gas supply unit for supplying a gas to a second gas injection unit. The first gas supply unit may include a first supply line connected to the first gas injection unit, a plurality of first gas supply modules connected to the first supply line, and a first measurement module measuring a first pressure of the first supply line. The second gas supply unit may include a second supply line connected to the second gas injection unit, a plurality of second gas supply modules connected to the second supply line, and a second measurement module measuring a second pressure of the second supply line. The first measurement module may check whether the first pressure is outside a first reference value. The second measurement module may check whether the second pressure is outside a second reference value.

A gas supply apparatus for substrate processing apparatus according to the present inventive concept may include: a plurality of supply lines individually connected to a plurality of gas injection units, respectively; a plurality of gas supply modules respectively connected to the supply lines; and a plurality of measurement modules respectively measuring pressures of the supply lines. Each of the measurement modules may check whether the pressure is outside a reference value.

Advantageous Effect

According to the present inventive concept, the following effects may be realized.

The present inventive concept is implemented to check a breakdown or an abnormal operation occurring in gas supply modules even when a processing process is being performed on a substrate. Accordingly, the present inventive concept may prevent a processing process from being continuously performed on a substrate in a state where a breakdown or an abnormal operation occurs in gas supply modules, thereby decreasing damage and loss.

The present inventive concept may shorten a time taken until post-processing such as repair is performed from a time at which a breakdown or an abnormal operation occurs in gas supply modules, and thus, may contribute to enhance productivity by increasing an operating rate of a substrate processing apparatus.

MODE FOR INVENTION

Hereinafter, an embodiment of a gas supply apparatus for substrate processing apparatus according to the present inventive concept will be described in detail with reference to the accompanying drawings.

Figure 1:
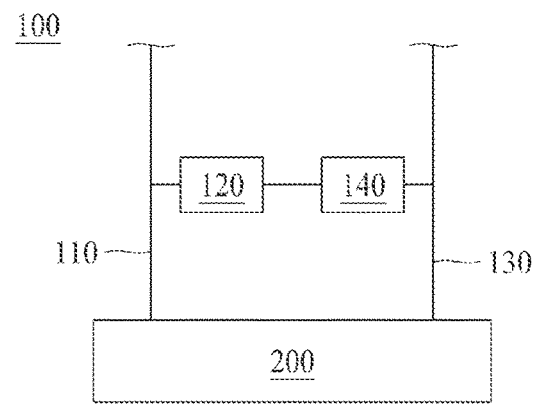
FIG. 1 is a schematic block diagram of a gas supply apparatus according to the related art.
Figure 2:
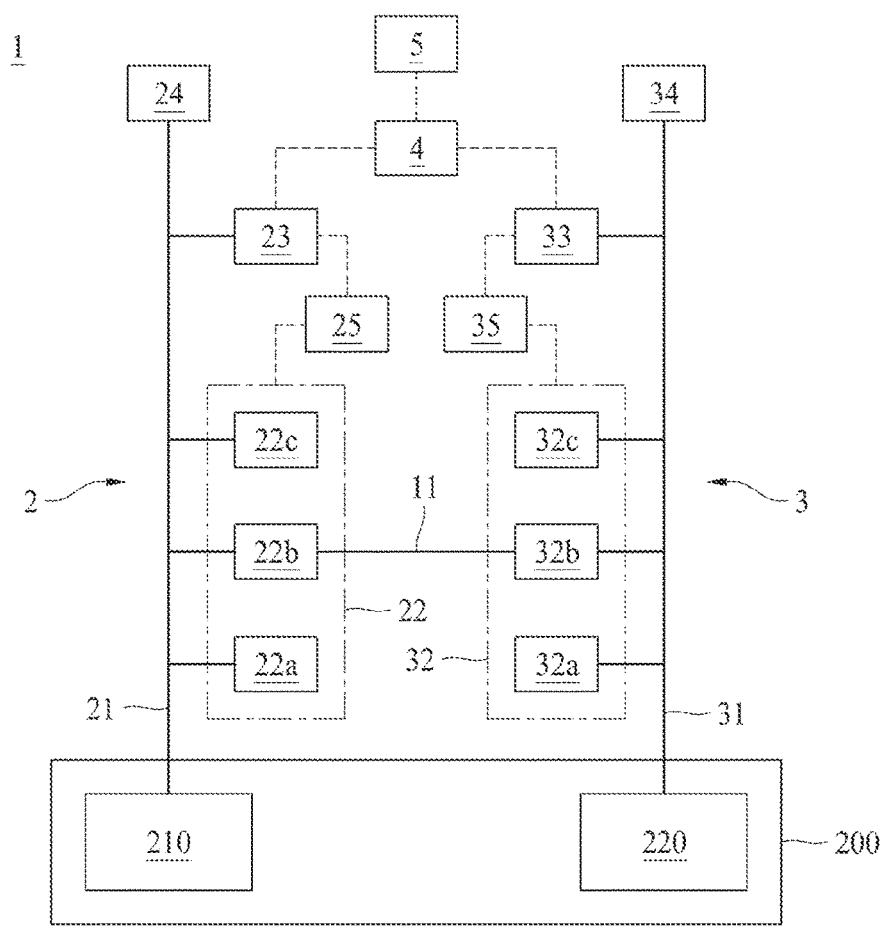
FIG. 2 is a schematic block diagram of a substrate processing apparatus and a gas supply apparatus for substrate processing apparatus according to the present inventive concept.

Referring to FIG. 2, a gas supply apparatus 1 for substrate processing apparatus according to the present inventive concept supplies a gas to a substrate processing apparatus 200. The substrate processing apparatus 200 performs a processing process on a substrate 300. The substrate 300 may be a silicon substrate, a glass substrate, a metal substrate, or the like. The substrate processing apparatus 200 may perform a deposition process of depositing a thin film on the substrate 300 and an etching process of removing a portion of the thin film deposited on the substrate 300.

Before describing the gas supply apparatus 1 for substrate processing apparatus according to the present inventive concept, the substrate processing apparatus 200 will be described below in detail.

Figure 3:
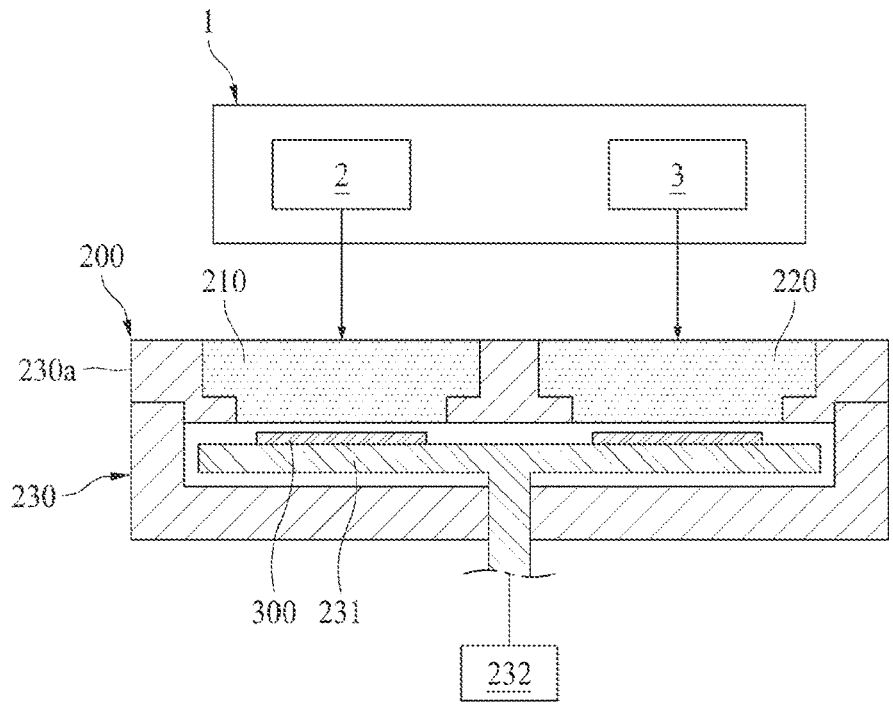
FIGS. 3 and 4 are schematic side cross-sectional views of an embodiment of a substrate processing apparatus to which a gas supply apparatus for substrate processing apparatus according to the present inventive concept is applied.
Figure 4:
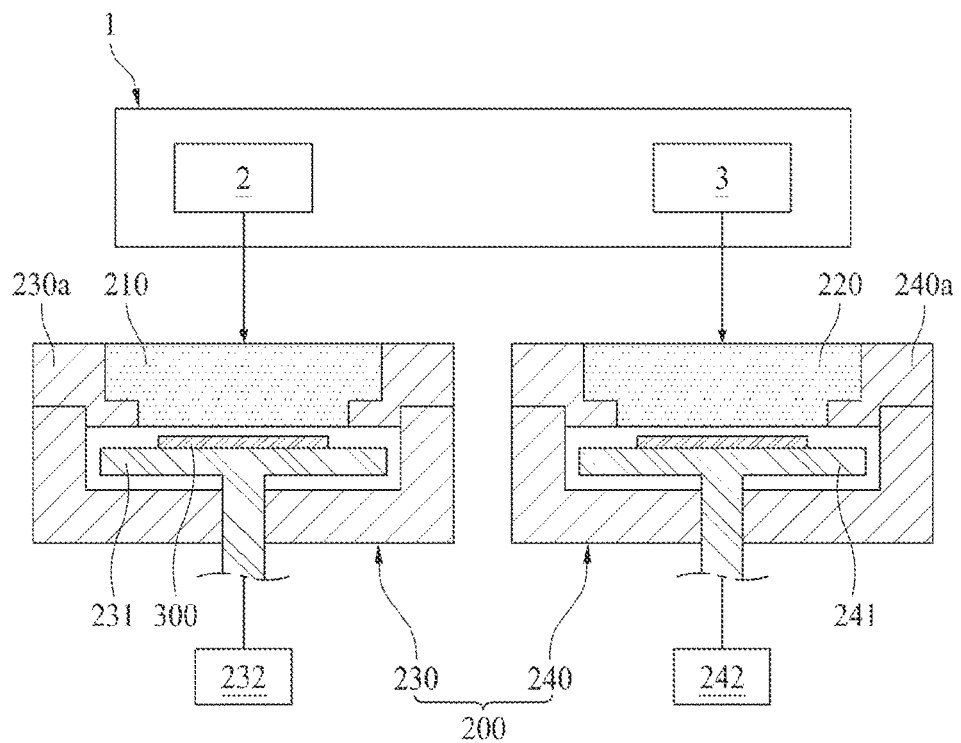

Referring to FIGS. 3 and 4, the substrate processing apparatus 200 may include a first gas injection unit 210 and a second gas injection unit 220. The first gas injection unit 210 and the second gas injection unit 220 inject a gas into a processing space where a processing process is performed on the substrate 300. The gas supply apparatus 1 for substrate processing apparatus according to the present inventive concept may supply a gas to the first gas injection unit 210 and the second gas injection unit 220. The first gas injection unit 210 and the second gas injection unit 220 may inject a gas toward different substrates 300.

The first gas injection unit 210 and the second gas injection unit 220 may be installed in a first process chamber 230 included in the substrate processing apparatus 200. In this case, as illustrated in FIG. 3, the first gas injection unit 210 and the second gas injection unit 220 may be implemented to inject a gas into different processing regions in the first process chamber 230. The first gas injection unit 210 and the second gas injection unit 220 may be installed at a first lid 230a disposed at an upper portion of the first process chamber 230. A first substrate supporting unit 231 supporting the substrate 300 may be installed in the first process chamber 230. The first gas injection unit 210 and the second gas injection unit 220 may be disposed on the first substrate supporting unit 231 and may inject a gas toward the first substrate supporting unit 231. In this case, the first substrate supporting unit 231 may be intermittently or continuously rotated by a first rotation module 232. Although not shown, three or more gas injection units may be installed in the first process chamber 230. In this case, the gas supply apparatus 1 for substrate processing apparatus according to the present inventive concept may be implemented to supply a gas to each of the gas injection units.

The first gas injection unit 210 may be installed in the first process chamber 230 included in the substrate processing apparatus 200, and the second gas injection unit 220 may be installed in the second process chamber 240 included in the substrate processing apparatus 200. In this case, as illustrated in FIG. 4, the first gas injection unit 210 may be implemented to inject a gas into the first process chamber 230. The first gas injection unit 210 may be installed at the first lid 230a. The first substrate supporting unit 231 may be installed in the first process chamber 230. The first gas injection unit 210 may be disposed on the first substrate supporting unit 231 and may inject a gas toward the first substrate supporting unit 231. In this case, the first substrate supporting unit 231 may be intermittently or continuously rotated by the first rotation module 232. The second gas injection unit 220 may be implemented to inject a gas into the second process chamber 240. The second gas injection unit 220 may be installed at a second lid 240a disposed at an upper portion of the second process chamber 240. The second substrate supporting unit 241 supporting the substrate 300 may be installed in the second process chamber 240. The second gas injection unit 220 may be disposed on the second substrate supporting unit 241 and may inject a gas toward the second substrate supporting unit 241. In this case, the second substrate supporting unit 241 may be intermittently or continuously rotated by a second rotation module 242. As described above, the substrate processing apparatus 200 may include the first process chamber 230 and the second process chamber 240 including independent process spaces, and thus, may be implemented as a cluster type. Although not shown, the substrate processing apparatus 200 may include three or more process chambers. In this case, the gas supply apparatus 1 for substrate processing apparatus according to the present inventive concept may be implemented to supply a gas injection unit included in each of the process chambers.

In performing a processing process on the substrate 300 by using the substrate processing apparatus 200, the gas supply apparatus 1 for substrate processing apparatus according to the present inventive concept may perform a function of supplying a gas to the substrate processing apparatus 200.

To this end, the gas supply apparatus 1 for substrate processing apparatus according to the present inventive concept may include a first gas supply unit 2 for supplying a gas to the first gas injection unit 210 and a second gas supply unit 3 for supplying a gas to the second gas injection unit 220. The first gas supply unit 2 may include a first supply line 21 which is connected to the first gas injection unit 210, a plurality of first gas supply modules 22 which are connected to the first supply line 21, and a first measurement module 23 which measures a first pressure of the first supply line 21. The second gas supply unit 3 may include a second supply line 31 which is connected to the second gas injection unit 220, a plurality of second gas supply modules 32 which are connected to the second supply line 31, and a second measurement module 33 which measures a second pressure of the second supply line 31.

Here, the first measurement module 23 may check whether the first pressure is outside a first reference value. The second measurement module 33 may check whether the second pressure is outside a second reference value.

Therefore, the gas supply apparatus 1 for substrate processing apparatus according to the present inventive concept is implemented to check a breakdown or an abnormal operation occurring in one of the first gas supply module 22 and the second gas supply module 32 connected in a parallel structure with respect to the substrate processing apparatus 200 by using the first measurement module 23 and the second measurement module 33 in a case where there are some gas supply modules connected in a parallel structure with respect to the substrate processing apparatus 200 among the first gas supply modules and the second gas supply modules. For example, when a breakdown or an abnormal operation occurs in the first gas supply modules 22 among the first gas supply modules and the second gas supply modules connected in a parallel structure with respect to the substrate processing apparatus 200, the first measurement module 23 may check the breakdown or the abnormal operation occurring in the first gas supply module 22, on the basis of that the first pressure is outside the first reference value.

Therefore, the gas supply apparatus 1 for substrate processing apparatus according to the present inventive concept is implemented to check in real time a breakdown or an abnormal operation occurring in the gas supply modules 22 and 32 even when a processing process is being performed on the substrate 300. Accordingly, the gas supply apparatus 1 for substrate processing apparatus according to the present inventive concept may prevent a processing process from being continuously performed on the substrate 300 in a state where a breakdown or an abnormal operation occurs in the gas supply modules 22 and 32, thereby decreasing damage and loss. Also, the gas supply apparatus 1 for substrate processing apparatus according to the present inventive concept may shorten a time taken until post-processing such as repair is performed from a time at which a breakdown or an abnormal operation occurs in the gas supply modules 22 and 32, and thus, may contribute to enhance productivity by increasing an operating rate of the substrate processing apparatus 200.

Hereinafter, the first gas supply unit 2 and the second gas supply unit 3 will be described in detail with reference to the accompanying drawings.

Referring to FIGS. 2 to 5, the first gas supply unit 2 supplies a gas to the first gas injection unit 210. The first gas supply unit 2 may supply the first gas injection unit 210 with a process gas used for a processing process performed on the substrate 300 and a purge gas for purging. The first gas supply unit 2 may sequentially supply two or more kinds of process gases to the first gas injection unit 210 in a process sequence. For example, in a case where the substrate processing apparatus 200 performs a deposition process, the first gas supply unit 2 may supply a source gas and a reactant gas to the first gas injection unit 210. For example, in a case where the substrate processing apparatus 200 performs an etching process, the first gas supply unit 2 may supply an etch gas to the first gas injection unit 210.

The first gas supply unit 2 may include the first supply line 21, the first gas supply modules 22, and the first measurement module 23.

The first supply line 21 is connected to the first gas injection unit 210. A gas supplied by the first gas supply modules 22 may be supplied to the first gas injection unit 210 through the first supply line 21. The first supply line 21 may be implemented with a hose, a pipe, or the like. The first supply line 21 may be implemented as a hole formed in a certain structure material.

The first gas supply modules 22 are connected to the first supply line 21. The first gas supply modules 22 may supply a gas to the first supply line 21. Each of the first gas supply modules 22 may be connected to a gas storage module (not shown). The first gas supply modules 22 may supply the first supply line 21 with a gas supplied from the gas storage modules, and thus, may supply a gas to the first gas injection unit 210 through the first supply line 21. The first gas supply modules 22 may each include a valve, which selectively transmits a gas, and a mass flow controller (MFC). Each of the first gas supply modules 22 may further include a buffer tank for increasing a supply pressure of a gas. The first gas supply modules 22 may be connected to different portions of the first supply line 21 on the basis of a direction in which the first supply line 21 is arranged. The first gas supply modules 22 may supply different gases. Some of the first gas supply modules 22 may supply the same gas, and the other first gas supply modules 22 may supply different gases. The first gas supply modules 22 may operate based on control by a control module (not shown) so that a predetermined gas is supplied to the first gas injection unit 210 at a predetermined flow rate range in a process sequence. Also, in a case where the first gas injection unit 210 injects a plurality of different source gases so as to form a composite film, a plurality of first gas supply modules 22 among the first gas supply modules 22 may respectively supply different source gases to the first supply line 21. In this case, corresponding first gas supply modules 22 may simultaneously supply different source gases to the first supply line 21. As described above, the gas supply apparatus 1 for substrate processing apparatus according to the present inventive concept may be implemented to supply different source gases to the first supply line 21 through a plurality of first gas supply modules 22, and thus, may precisely control a flow rate of each of source gases, thereby contributing to form a composite film having a composition ratio desired by the substrate processing apparatus 200.

In FIG. 2, the first gas supply unit 2 is illustrated as including three first gas supply modules 22a, 22b, and 22c, but is not limited thereto and may include two or four or more first gas supply modules 22.

The first measurement module 23 measures the first pressure. The first pressure may be an internal pressure of the first supply line 21 and may vary based on the kind of a gas flowing along the first supply line 21 and a flow rate of the gas. The first measurement module 23 may check whether the first pressure is outside the first reference value. The first reference value may be determined based on the kind of a gas, which should be supplied to the first gas injection unit 210, and a flow rate of the gas. The first reference value may be a pressure value calculated through a previous test and may be previously stored in the first measurement module 23. The first reference value may be a single value. The first reference value may be a range value having an upper limit value and a lower limit value. In this case, when the first pressure is less than a lower limit value of the first reference value and when the first pressure is greater than an upper limit value of the first reference value, the first measurement module 23 may determine that the first pressure is outside the first reference value. When the first pressure is greater than or equal to the lower limit value of the first reference value and when the first pressure is less than or equal to the upper limit value of the first reference value, the first measurement module 23 may determine that the first pressure is not outside the first reference value and is within the first reference value. The first measurement module 23 may include a pressure gauge.

When it is checked by the first measurement module 23 that the first pressure is outside the first reference value, the first gas supply modules 22 may stop the supply of a gas. Therefore, the gas supply apparatus 1 for substrate processing apparatus according to the present inventive concept may more decrease damage and loss caused by a breakdown or an abnormal operation occurring in the first gas supply modules 22. In this case, when it is checked that the first pressure is outside the first reference value, the first measurement module 23 may generate a first error signal, and then, may provide the first error signal to the first gas supply modules 22. When the first error signal is received, the first gas supply modules 22 may stop the supply of a gas. The first measurement module 23 may provide the first error signal to the control module. In this case, the first gas supply modules 22 may stop the supply of a gas on the basis of control by the control module. The first measurement module 23 may provide the first error signal to the substrate processing apparatus 200. When the first error signal is received, the first gas injection unit 210 may stop operations of elements associated with the first gas injection unit 210. When the first error signal is received, the substrate processing apparatus 200 may stop an overall operation.

Figure 5:
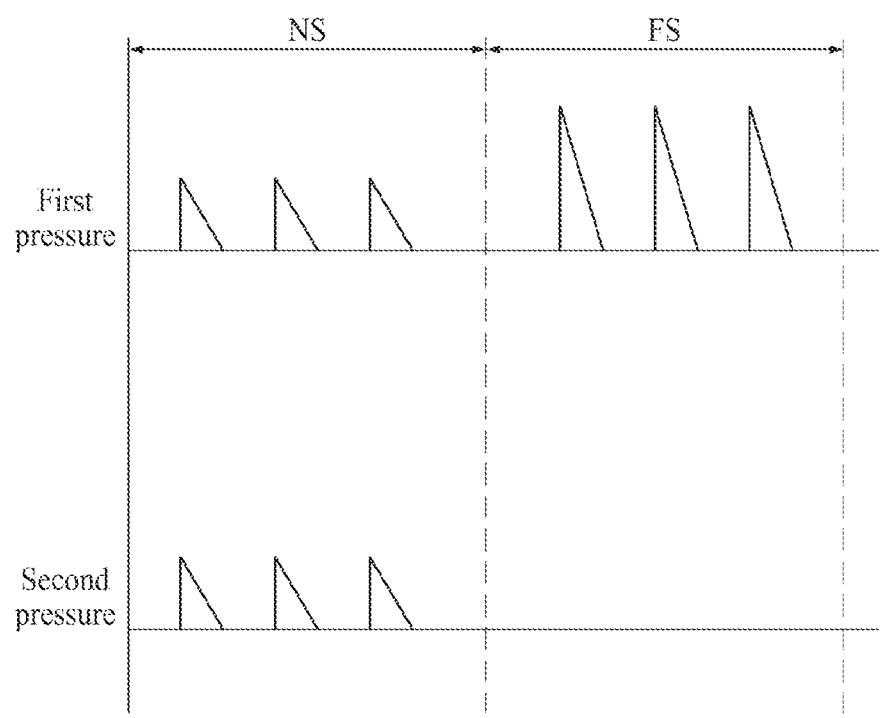
FIG. 5 is a graph showing a first pressure measured by a first measurement module and a second pressure measured by a second measurement module in a gas supply apparatus for substrate processing apparatus according to the present inventive concept, with respect to a time.

The first measurement module 23 may check whether a first gas pressure of the first pressure is outside the first reference value. In this case, as illustrated in FIG. 5, the first gas supply modules 22 may supply a gas on the basis of a method which progressively reduces a pressure after the gas is initially supplied with a maximum pressure. In FIG. 5, the ordinate axis may relate to a pressure of a gas, and a height may relate to a time. The first gas pressure may correspond to a maximum pressure. The first measurement module 23 may check whether a level of the first gas pressure is outside the first reference value. The first measurement module 23 may check whether a level of the first gas pressure is outside the first reference value, on the basis of a level of the first gas pressure and a timing at which the first gas pressure appears.

The first measurement module 23 may compare the first pressure with the first reference value which differs for each of the first gas supply modules 22. In this case, the first reference value may be differently set for each of the first gas supply modules 22. Accordingly, the gas supply apparatus 1 for substrate processing apparatus according to the present inventive concept may be enhanced in general purpose capable of being applied to the substrate processing apparatus 200 which performs a processing process on the substrate 200 by using various kinds of gases and various flow-rate gases.

When a processing process is being performed on the substrate 300, the first measurement module 23 may continuously check whether the first pressure is outside the first reference value. When the process gas is being supplied to the first supply line 21, the first measurement module 23 may check whether the first pressure is outside the first reference value. In only a case where a gas to be measured in a process sequence is supplied to the first supply line 21, the first measurement module 23 may check whether the first pressure is outside the first reference value. For example, in a case where the first gas supply unit 2 supplies a gas to the first gas injection unit 210 in the order of a source gas, a purge gas, a reactant gas, and a purge gas, only when the source gas and the reactant gas are supplied, the first measurement module 23 may check whether the first pressure is outside the first reference value. In this case, when the purge gas is supplied, the first measurement module 23 may not check whether the first pressure is outside the first reference value. Accordingly, the gas supply apparatus 1 for substrate processing apparatus according to the present inventive concept may reduce a load which is applied to the first measurement module 23 as an operation of checking whether the first pressure is outside the first reference value is performed, and thus, the use lifetime of the first measurement module 23 may extend. A process sequence and a gas to be measured may be previously stored in the first measurement module 23.

Referring to FIGS. 2 to 5, the first gas supply unit 2 may include a first purge module 24.

The first purge module 24 supplies a purge gas to the first supply line 21. A purge gas supplied to the first supply line 21 by the first purge module 24 may perform a purge function of purging a gas remaining in the first supply line 21. Accordingly, the gas supply apparatus 1 for substrate processing apparatus according to the present inventive concept may prevent the first supply line 21 from being polluted by a gas remaining in the first supply line 21. The first purge module 24 may continuously supply a purge gas to the first supply line 21. Therefore, the first purge gas 24 may have the purge function. In a case where the first purge module 24 continuously supplies a purge gas to the first supply line 21, a gas supplied to the first supply line 21 by the first gas supply modules 22 may be supplied to the first gas injection unit 210 along with the purge gas. In this case, the purge gas supplied by the first purge module 24 may function as a carrier gas which helps the flow of a gas supplied by the first gas supply modules 22.

The first purge module 24 may be connected to one end of the first supply line 21. In this case, the other end of the first supply line 21 may be connected to the first gas injection unit 210. The first gas supply modules 22 may be connected to the first supply line 21 between the one end of the first supply line 21 and the other end of the first supply line 21. Therefore, the first purge module 24 may be disposed at a position which enables purging of all gases supplied to the first supply line 21 by the first gas supply modules 22. The first measurement module 23 may be connected to the first supply line 21 between the first purge gas 24 and the first gas supply module 22. In this case, the first measurement module 23 may be connected to the first supply line 21 between the first purge module 24 and the first gas supply module 22 disposed closest to the first purge module 24 on the basis of a direction in which the first supply line 21 is arranged. For example, with respect to FIG. 2, the first measurement module 23 may be connected to the first supply line 21 between the first purge module 24 and the first gas supply module 22c. Therefore, the first purge module 24 may prevent a gas, supplied to the first supply line 21 by the first gas supply modules 22 through the supply of a purge gas, from flowing toward the first measurement module 23 through reverse flow. Accordingly, the first purge module 24 may prevent the pollution of the first measurement module 23, thereby contributing to extend the use lifetime of the first measurement module 23. Also, the first purge module 24 may prevent the pollution of the first measurement module 23, and thus, may contribute to enhance the accuracy of a measurement value of the first pressure.

In a case where the first purge module 24 is provided, the first measurement module 23 may check whether the first pressure is outside the first reference value, in the other case except a case where only a purge gas supplied to the first supply line 21 by the first purge module 24 flows. That is, the first measurement module 23 may not check whether the first pressure is outside the first reference value, in a case where only the purge gas supplied to the first supply line 21 by the first purge module 24 flows. Accordingly, the gas supply apparatus 1 for substrate processing apparatus according to the present inventive concept may reduce a load which is applied to the first measurement module 23, and thus, the use lifetime of the first measurement module 23 may extend.

Referring to FIGS. 2 to 5, the first gas supply unit 2 may include a first detection module 25.

The first detection module 25 detects the first gas supply module 22, which has injected a gas where the first pressure is outside the first reference value, from among the first gas supply modules 22. When it is checked by the first measurement module 23 that the first pressure is outside the first reference value, the first measurement module 23 may provide the first error signal to the first detection module 25. When the first error signal is received, the first detection module 25 may detect the first gas supply module 25, which has supplied a gas when the first measurement module 23 generates the first error signal, from among the first gas supply modules 22. In this case, the first gas supply modules 22 may provide the first detection module 25 with first operation information about a time at which a gas is supplied and a time at which the supply of the gas stops. The first detection module 25 may detect the first gas supply module 22 which has injected a gas where the first pressure is outside the first reference value, on the basis of the first error signal and the first operation information. The first detection module 25 may display the detected first gas supply module 22 through a display device (not shown). When the first gas supply module 22, which has injected a gas where the first pressure is outside the first reference value, is detected, the first detection module 25 may output an alarm through an alarm device (not shown). Accordingly, the gas supply apparatus 1 for substrate processing apparatus according to the present inventive concept may inform a worker of information about the first gas supply module 22 requiring post-processing such as repair by using the first detection module 25, and thus, may contribute to shorten a time taken in post-processing.

Referring to FIGS. 2 to 5, the second gas supply unit 3 supplies a gas to the second gas injection unit 220. The second gas supply unit 3 may supply the second gas injection unit 220 with a process gas used for a processing process performed on the substrate 300 and a purge gas for purging. The second gas supply unit 3 may sequentially supply two or more kinds of process gases to the second gas injection unit 220 in a process sequence. For example, in a case where the substrate processing apparatus 200 performs a deposition process, the second gas supply unit 3 may supply a source gas and a reactant gas to the second gas injection unit 220. For example, in a case where the substrate processing apparatus 200 performs an etching process, the second gas supply unit 3 may supply an etch gas to the second gas injection unit 220.

The second gas supply unit 3 may include the second supply line 31, the second gas supply modules 32, and the second measurement module 33.

The second supply line 31 is connected to the second gas injection unit 220. A gas supplied by the second gas supply modules 32 may be supplied to the second gas injection unit 220 through the second supply line 31. The second supply line 31 may be implemented with a hose, a pipe, or the like. The second supply line 31 may be implemented as a hole formed in a certain structure material.

The second gas supply modules 32 are connected to the second supply line 31. The second gas supply modules 32 may supply a gas to the second supply line 31. Each of the second gas supply modules 32 may be connected to a gas storage module (not shown). The second gas supply modules 32 may supply the second supply line 31 with a gas supplied from the gas storage modules, and thus, may supply a gas to the second gas injection unit 220 through the second supply line 31. The second gas supply modules 32 may each include a valve, which selectively transmits a gas, and a mass flow controller (MFC). Each of the second gas supply modules 32 may further include a buffer tank for increasing a supply pressure of each gas. The second gas supply modules 32 may be connected to different portions of the second supply line 31 on the basis of a direction in which the second supply line 31 is arranged. The second gas supply modules 32 may supply different gases. Some of the second gas supply modules 32 may supply the same gas, and the other second gas supply modules 32 may supply different gases. The second gas supply modules 32 may operate based on control by a control module (not shown) so that a predetermined gas is supplied to the second gas injection unit 220 at a predetermined flow rate range in a process sequence. Also, in a case where the second gas injection unit 220 injects a plurality of different source gases so as to form a composite film, a plurality of second gas supply modules 32 among the second gas supply modules 32 may respectively supply different source gases to the second supply line 31. In this case, corresponding second gas supply modules 32 may simultaneously supply different source gases to the second supply line 31. As described above, the gas supply apparatus 1 for substrate processing apparatus according to the present inventive concept may be implemented to supply different source gases to the second supply line 31 through a plurality of second gas supply modules 32, and thus, may precisely control a flow rate of each of source gases, thereby contributing to form a composite film having a composition ratio desired by the substrate processing apparatus 200.

In FIG. 2, the second gas supply unit 3 is illustrated as including three second gas supply modules 32a, 32b, and 32c, but is not limited thereto and may include two or four or more second gas supply modules 32.

The second measurement module 33 measures the second pressure. The second measurement module 33 may include a pressure gauge. The second pressure may be an internal pressure of the second supply line 31 and may vary based on the kind of a gas flowing along the second supply line 31 and a flow rate of the gas. The second measurement module 33 may check whether the second pressure is outside the second reference value. The second reference value may be determined based on the kind of a gas, which should be supplied to the second gas injection unit 220, and a flow rate of the gas. The second reference value may be an input value calculated through a previous test and may be previously stored in the second measurement module 33. The second reference value may be a single value. The second reference value may be a range value having an upper limit value and a lower limit value. In this case, when the second pressure is less than a lower limit value of the second reference value and when the second pressure is greater than an upper limit value of the second reference value, the second measurement module 33 may determine that the second pressure is outside the second reference value. When the second pressure is greater than or equal to the lower limit value of the second reference value and when the second pressure is less than or equal to the upper limit value of the second reference value, the second measurement module 33 may determine that the second pressure is not outside the second reference value and is within the second reference value.

For example, in a case where the first gas supply module 22 and the second gas supply module 32 connected to each other in a parallel structure are provided, the first pressure may be within the first reference value and the second pressure may be within the second reference value, in a period NS (illustrated in FIG. 5) where the first gas supply module 22 and the second gas supply module 32 operate normally in mode. In this case, the first measurement module 23 may check that the first pressure is within the first reference value, and the second measurement module 33 may check that the second pressure is within the second reference value. However, when it is unable to supply a gas because a breakdown or an abnormal operation occurs in the second gas supply module 32, a gas to be supplied by the second gas supply module 32 may be supplied to the first supply line 21 through the first gas supply module 22. As described above, the first pressure is greater than the upper limit value of the first reference value and the second pressure is less than the lower limit value of the second reference value, in a period FS (illustrated in FIG. 5) where a breakdown or an abnormal operation occurs in one of the first gas supply module 22 and the second gas supply module 32. In this case, the first measurement module 23 may check that the first pressure is outside the first reference value, and the second measurement module 33 may check that the second pressure is outside the second reference value.

When it is checked by the second measurement module 33 that the second pressure is outside the second reference value, the second gas supply modules 32 may stop the supply of a gas. Therefore, the gas supply apparatus 1 for substrate processing apparatus according to the present inventive concept may more decrease damage and loss caused by a breakdown or an abnormal operation occurring in the second gas supply modules 32. In this case, when it is checked that the second pressure is outside the second reference value, the second measurement module 33 may generate a second error signal, and then, may provide the second error signal to the second gas supply modules 32. When the second error signal is received, the second gas supply modules 32 may stop the supply of a gas. The second measurement module 33 may provide the second error signal to the control module. In this case, the second gas supply modules 32 may stop the supply of a gas on the basis of control by the control module. The second measurement module 33 may provide the second error signal to the substrate processing apparatus 200. When the second error signal is received, the second gas injection unit 220 may stop operations of elements associated with the second gas injection unit 220. When the second error signal is received, the substrate processing apparatus 200 may stop an overall operation.

The second measurement module 33 may check whether a second gas pressure of the second pressure is outside the second reference value. In this case, as illustrated in FIG. 5, the second gas supply modules 32 may supply a gas on the basis of a method which progressively reduces a pressure after the gas is initially supplied with a maximum pressure. The second gas pressure may correspond to a maximum pressure. The second measurement module 33 may check whether a level of the second gas pressure is outside the second reference value. The second measurement module 33 may check whether a level of the second gas pressure is outside the second reference value, on the basis of a level of the second gas pressure and a timing at which the second gas pressure appears.

The second measurement module 33 may compare the second pressure with the second reference value which differs for each of the second gas supply modules 32. In this case, the second reference value may be differently set for each of the second gas supply modules 22. Accordingly, the gas supply apparatus 1 for substrate processing apparatus according to the present inventive concept may be enhanced in general purpose capable of being applied to the substrate processing apparatus 200 which performs a processing process on the substrate 200 by using various kinds of gases and various flow-rate gases.

When a processing process is being performed on the substrate 300, the second measurement module 33 may continuously check whether the second pressure is outside the second reference value. When the process gas is being supplied to the second supply line 31, the second measurement module 33 may check whether the second pressure is outside the second reference value. In only a case where a gas to be measured in a process sequence is supplied to the second supply line 31, the second measurement module 33 may check whether the second pressure is outside the second reference value. For example, in a case where the second gas supply unit 3 supplies a gas to the second gas injection unit 220 in the order of a source gas, a purge gas, a reactant gas, and a purge gas, only when the source gas and the reactant gas are supplied, the second measurement module 33 may check whether the second pressure is outside the second reference value. In this case, when the purge gas is supplied, the second measurement module 33 may not check whether the second pressure is outside the second reference value. Accordingly, the gas supply apparatus 1 for substrate processing apparatus according to the present inventive concept may reduce a load which is applied to the second measurement module 33 as an operation of checking whether the second pressure is outside the second reference value is performed, and thus, the use lifetime of the second measurement module 33 may extend. A process sequence and a gas to be measured may be previously stored in the second measurement module 33.

Referring to FIGS. 2 to 5, the second gas supply unit 3 may include a second purge module 34.

The second purge module 34 supplies a purge gas to the second supply line 31. A purge gas supplied to the second supply line 31 by the second purge module 34 may perform a purge function of purging a gas remaining in the second supply line 31. Accordingly, the gas supply apparatus 1 for substrate processing apparatus according to the present inventive concept may prevent the second supply line 31 from being polluted by a gas remaining in the second supply line 31. The second purge module 34 may continuously supply a purge gas to the second supply line 31. Therefore, the second purge gas 34 may have the purge function. In a case where the second purge module 34 continuously supplies a purge gas to the second supply line 31, a gas supplied to the second supply line 31 by the second gas supply modules 32 may be supplied to the second gas injection unit 220 along with the purge gas. In this case, the purge gas supplied by the second purge module 34 may function as a carrier gas which helps the flow of a gas supplied by the second gas supply modules 32.

The second purge module 34 may be connected to one end of the second supply line 31. In this case, the other end of the second supply line 31 may be connected to the second gas injection unit 220. The second gas supply modules 32 may be connected to the second supply line 31 between the one end of the second supply line 31 and the other end of the second supply line 31. Therefore, the second purge module 34 may be disposed at a position which enables purging of all gases supplied to the second supply line 31 by the second gas supply modules 32. The second measurement module 33 may be connected to the second supply line 31 between the second purge gas 34 and the second gas supply module 32. In this case, the second measurement module 33 may be connected to the second supply line 31 between the second purge module 34 and the second gas supply module 32 disposed closest to the second purge module 34 on the basis of a direction in which the second supply line 31 is arranged. For example, with respect to FIG. 2, the second measurement module 33 may be connected to the second supply line 31 between the second purge module 34 and the second gas supply module 32c. Therefore, the second purge module 34 may prevent a gas, supplied to the second supply line 31 by the second gas supply modules 32 through the supply of a purge gas, from flowing toward the second measurement module 33 through reverse flow. Accordingly, the second purge module 34 may prevent the pollution of the second measurement module 33, thereby contributing to extend the use lifetime of the second measurement module 33. Also, the second purge module 34 may prevent the pollution of the second measurement module 33, and thus, may contribute to enhance the accuracy of a measurement value of the second pressure.

In a case where the second purge module 34 is provided, the second measurement module 33 may check whether the second pressure is outside the second reference value, in the other case except a case where only a purge gas supplied to the second supply line 31 by the second purge module 34 flows. That is, the second measurement module 33 may not check whether the second pressure is outside the second reference value, in a case where only the purge gas supplied to the second supply line 31 by the second purge module 34 flows. Accordingly, the gas supply apparatus 1 for substrate processing apparatus according to the present inventive concept may reduce a load which is applied to the second measurement module 33, and thus, the use lifetime of the second measurement module 33 may extend.

Referring to FIGS. 2 to 5, the second gas supply unit 3 may include a second detection module 35.

The second detection module 35 detects the second gas supply module 32, which has injected a gas where the second pressure is outside the second reference value, from among the second gas supply modules 32. When it is checked by the second measurement module 33 that the second pressure is outside the second reference value, the second measurement module 33 may provide the second error signal to the second detection module 35. When the second error signal is received, the second detection module 35 may detect the second gas supply module 35, which has supplied a gas when the second measurement module 33 generates the second error signal, from among the second gas supply modules 32. In this case, the second gas supply modules 32 may provide the second detection module 35 with second operation information about a time at which a gas is supplied and a time at which the supply of the gas stops. The second detection module 35 may detect the second gas supply module 32 which has injected a gas where the second pressure is outside the second reference value, on the basis of the second error signal and the second operation information. The second detection module 35 may display the detected second gas supply module 32 through the display device. When the second gas supply module 32, which has injected a gas where the second pressure is outside the second reference value, is detected, the second detection module 35 may output an alarm through the alarm device. Accordingly, the gas supply apparatus 1 for substrate processing apparatus according to the present inventive concept may inform a worker of information about the second gas supply module 32 requiring post-processing such as repair by using the second detection module 35, and thus, may contribute to shorten a time taken in post-processing.

Referring to FIGS. 2 to 5, one second gas supply module 32 among the second gas supply modules 32 and one first gas supply module 22 among the first gas supply modules 22 may be connected to each other through a first connection module 11. For example, the first connection module 11 may connect the second gas supply module 32b to the first gas supply module 22b. In this case, the second gas supply module 32b and the first gas supply module 22b may supply the same gas, and for example, may supply a pile-up gas. One side of the first connection module 11 may be connected to a gas storage module (not shown), and the other side thereof may be connected to all of the second gas supply module 32b and the first gas supply module 22b. Accordingly, the first connection module 11 may transfer a gas, supplied from the gas storage module, to all of the second gas supply module 32b and the first gas supply module 22b.

In this case, when it is checked by the first measurement module 23 that the first pressure is outside the first reference value on the basis of a gas injected by the first gas supply module 22b, the first connection module 11 may adjust a supply amount of a gas. For example, in a case where all of the first gas supply module 22b and the second gas supply module 32b operate normally, when a supply amount of a gas supplied by the first connection module 11 is defined as 1, the first connection module 11 may adjust a supply amount of a gas to 0.5. Therefore, when a breakdown or an abnormal operation occurs in the first gas supply module 22b, the gas supply apparatus 1 for substrate processing apparatus according to the present inventive concept may prevent the second gas supply module 32b from supplying a gas having an excessive flow rate by using the first connection module 11. In this case, by adjusting a supply amount of a gas by using the first connection module 11, the second pressure based on a gas supplied by the second gas supply module 32b may be within the second reference value. Therefore, even when the supply of a gas by the first gas injection unit 210 stops due to a breakdown or an abnormal operation occurring in the first gas supply module 22b, the gas supply apparatus 1 for substrate processing apparatus according to the present inventive concept may continuously perform the supply of a gas by the second gas injection unit 220. Accordingly, a processing process using the second gas injection unit 220 may be performed without being stopped, and thus, the gas supply apparatus 1 for substrate processing apparatus according to the present inventive concept may more reduce damage and loss caused by a breakdown or an abnormal operation occurring in the first gas supply module 22b.

In this case, when it is checked by the second measurement module 33 that the second pressure is outside the second reference value on the basis of a gas injected by the second gas supply module 32b, the first connection module 11 may adjust a supply amount of a gas. For example, in a case where all of the first gas supply module 22b and the second gas supply module 32b operate normally, when a supply amount of a gas supplied by the first connection module 11 is defined as 1, the first connection module 11 may adjust a supply amount of a gas to 0.5. Therefore, when a breakdown or an abnormal operation occurs in the second gas supply module 32b, the gas supply apparatus 1 for substrate processing apparatus according to the present inventive concept may prevent the first gas supply module 22b from supplying a gas having an excessive flow rate by using the first connection module 11. In this case, by adjusting a supply amount of a gas by using the first connection module 11, the first pressure based on a gas supplied by the first gas supply module 22b may be within the first reference value. Therefore, even when the supply of a gas by the second gas injection unit 220 stops due to a breakdown or an abnormal operation occurring in the second gas supply module 32b, the gas supply apparatus 1 for substrate processing apparatus according to the present inventive concept may continuously perform the supply of a gas by the first gas injection unit 210. Accordingly, a processing process using the first gas injection unit 210 may be performed without being stopped, and thus, the gas supply apparatus 1 for substrate processing apparatus according to the present inventive concept may more reduce damage and loss caused by a breakdown or an abnormal operation occurring in the second gas supply module 32b.

In FIG. 2, it is illustrated that only the first gas supply module 22b and the second gas supply module 32b are connected to each other by the first connection module 11, but the present inventive concept is not limited thereto and the first gas supply module 22 and the second gas supply module 32 connected to each other by a connection module (not shown) in a parallel structure may be provided as two or more. In this case, the gas supply apparatus 1 for substrate processing apparatus according to the present inventive concept may include a plurality of connection modules.

Referring to FIGS. 2 to 5, the gas supply apparatus 1 for substrate processing apparatus according to the present inventive concept may include a storage unit 4 and a control unit 5.

The storage unit 4 accumulates pressure data measured by each of the first measurement module 23 and the second measurement module 33. The first measurement module 23 may measure the first pressure, and then, may provide the first pressure to the storage unit 4. The second measurement module 33 may measure the second pressure, and then, may provide the second pressure to the storage unit 4. The storage unit 4 may store the first pressure provided from the first measurement module 23 and the second pressure provided from the second measurement module 33, and thus, may accumulate the pressure data.

The control unit 5 sets the first reference value and the second reference value. The control unit 5 may change the first reference value and the second reference value by using the pressure data accumulated into the storage unit 4. For example, when evaluation data of quality of the substrate 300 on which a processing process is completed is generated after the processing process is performed on the substrate 300 by supplying a gas on the basis of the first reference value and the second reference value set by an input of a worker, the control unit 5 may evaluate the suitability of each of the first reference value and the second reference value on the basis of the valuation data and the pressure data to change the first reference value and the second reference value. Accordingly, the gas supply apparatus 1 for substrate processing apparatus according to the present inventive concept may change the first reference value and the second reference value suitable for a corresponding processing process on the basis of evaluation data and pressure data which are accumulated by repeatedly performing the processing process on the substrate 300 through the supply of a gas, and thus, may contribute to more enhance the quality of the substrate 300 on which the processing process is completed. When the first reference value and the second reference value are changed, the control unit 5 may provide the changed first reference value and second reference value to the first measurement module 23 and the second measurement module 33.

Hereinabove, an embodiment has been described where the gas supply apparatus 1 for substrate processing apparatus according to the present inventive concept includes the first gas supply unit 2 and the second gas supply unit 3, but the gas supply apparatus 1 for substrate processing apparatus according to the present inventive concept is not limited thereto and may include three or more gas supply units. In this case, the substrate processing apparatus 200 may include three or more gas injection units. Accordingly, the gas supply apparatus 1 for substrate processing apparatus according to the present inventive concept may be implemented to include a plurality of supply lines which are individually and respectively connected to a plurality of gas injection units, a plurality of gas supply modules which are respectively connected to the supply lines, and a plurality of measurement modules which respectively measure pressures of the supply lines. Each of the measurement modules may check whether the pressure is outside a reference value.

The present inventive concept described above are not limited to the above-described embodiments and the accompanying drawings and those skilled in the art will clearly appreciate that various modifications, deformations, and substitutions are possible without departing from the scope and spirit of the invention.

The invention claimed is:

1. A gas supply apparatus for substrate processing apparatus, the gas supply apparatus comprising:
a first gas supply unit for supplying a gas to a first gas injection unit; and
a second gas supply unit for supplying a gas to a second gas injection unit,
wherein:
the first gas supply unit comprises a first supply line connected to the first gas injection unit, a plurality of first gas supply modules connected to the first supply line, and a first measurement module measuring a first pressure of the first supply line,
the second gas supply unit comprises a second supply line connected to the second gas injection unit, a plurality of second gas supply modules connected to the second supply line, and a second measurement module measuring a second pressure of the second supply line,
the first measurement module checks whether the first pressure is outside a first reference value,
the second measurement module checks whether the second pressure is outside a second reference value
wherein the gas supply apparatus further comprises:
a control unit setting the first reference value and the second reference value; and
a storage unit accumulating pressure data measured by each of the first measurement module and the second measurement module,
wherein the control unit changes the first reference value and the second reference value by using the pressure data accumulated in the storage unit.

2. The gas supply apparatus of claim 1, wherein the first gas supply unit comprises a first purge module supplying a purge gas to the first supply line.

3. The gas supply apparatus of claim 2, wherein the first purge module continuously supplies the purge gas to the first supply line.

4. The gas supply apparatus of claim 1, wherein the first measurement module compares the first pressure with the first reference value which differs for each of the first gas supply modules.

5. The gas supply apparatus of claim 1, wherein, when it is checked that the first pressure is outside the first reference value, the first gas supply modules stop supply of a gas.

6. The gas supply apparatus of claim 1, wherein the first gas supply unit and the second gas supply unit supply a gas to the first gas injection unit and the second gas injection unit installed in a first process chamber included in a substrate processing apparatus.

7. A gas supply apparatus for substrate processing apparatus, the gas supply apparatus comprising:
a first gas supply unit for supplying a gas to a first gas injection unit; and
a second gas supply unit for supplying a gas to a second gas injection unit, wherein:
the first gas supply unit comprises a first supply line connected to the first gas injection unit, a plurality of first gas supply modules connected to the first supply line, and a first measurement module measuring a first pressure of the first supply line, the second gas supply unit comprises a second supply line connected to the second gas injection unit, a plurality of second gas supply modules connected to the second supply line, and a second measurement module measuring a second pressure of the second supply line, the first measurement module checks whether the first pressure is outside a first reference value, the second measurement module checks whether the second pressure is outside a second reference value, the first gas supply unit further comprises a first purge module supplying a purge gas to the first supply line, and the first measurement module is connected to the first supply line between the first purge module and the first gas supply modules.

8. A gas supply apparatus for substrate processing apparatus, the gas supply apparatus comprising:

a first gas supply unit for supplying a gas to a first gas injection unit; and a second gas supply unit for supplying a gas to a second gas injection unit, wherein:

the first gas supply unit comprises a first supply line connected to the first gas injection unit, a plurality of first gas supply modules connected to the first supply line, and a first measurement module measuring a first pressure of the first supply line, the second gas supply unit comprises a second supply line connected to the second gas injection unit, a plurality of second gas supply modules connected to the second supply line, and a second measurement module measuring a second pressure of the second supply line, the first measurement module checks whether the first pressure is outside a first reference value, the second measurement module checks whether the second pressure is outside a second reference value, the first gas supply unit further comprises a first purge module supplying a purge gas to the first supply line, and when a process gas is supplied to the first supply line, the first measurement module checks whether the first pressure is outside the first reference value.

9. A gas supply apparatus for substrate processing apparatus, the gas supply apparatus comprising:

a first gas supply unit for supplying a gas to a first gas injection unit; and a second gas supply unit for supplying a gas to a second gas injection unit, wherein:

the first gas supply unit comprises a first supply line connected to the first gas injection unit, a plurality of first gas supply modules connected to the first supply line, and a first measurement module measuring a first pressure of the first supply line, the second gas supply unit comprises a second supply line connected to the second gas injection unit, a plurality of second gas supply modules connected to the second supply line, and a second measurement module measuring a second pressure of the second supply line, the first measurement module checks whether the first pressure is outside a first reference value, the second measurement module checks whether the second pressure is outside a second reference value, the first gas supply unit comprises a first detection module; and the first detection module detects the first gas supply module injecting a gas where the first pressure is outside the first reference value, from among the first gas supply modules.

10. A gas supply apparatus for substrate processing apparatus, the gas supply apparatus comprising:

a first gas supply unit for supplying a gas to a first gas injection unit; and a second gas supply unit for supplying a gas to a second gas injection unit, wherein:

the first gas supply unit comprises a first supply line connected to the first gas injection unit, a plurality of first gas supply modules connected to the first supply line, and a first measurement module measuring a first pressure of the first supply line, the second gas supply unit comprises a second supply line connected to the second gas injection unit, a plurality of second gas supply modules connected to the second supply line, and a second measurement module measuring a second pressure of the second supply line, the first measurement module checks whether the first pressure is outside a first reference value, the second measurement module checks whether the second pressure is outside a second reference value, one first gas supply module among the first gas supply modules and one second gas supply module among the second gas supply modules are connected to each other through a first connection module, and when it is checked by the first measurement module that the first pressure is outside the first reference value on the basis of a gas injected by the first gas supply module connected to the first connection module, the first connection module adjusts a supply amount of a gas.

11. A gas supply apparatus for substrate processing apparatus, the gas supply apparatus comprising:

a first gas supply unit for supplying a gas to a first gas injection unit; and a second gas supply unit for supplying a gas to a second gas injection unit, wherein:

the first gas supply unit comprises a first supply line connected to the first gas injection unit, a plurality of first gas supply modules connected to the first supply line, and a first measurement module measuring a first pressure of the first supply line, the second gas supply unit comprises a second supply line connected to the second gas injection unit, a plurality of second gas supply modules connected to the second supply line, and a second measurement module measuring a second pressure of the second supply line, the first measurement module checks whether the first pressure is outside a first reference value, the second measurement module checks whether the second pressure is outside a second reference value, the first gas supply unit supplies a gas to the first gas injection unit installed in a first process chamber included in a substrate processing apparatus, and the second gas supply unit supplies a gas to the second gas injection unit installed in a second process chamber included in the substrate processing apparatus.

* * * * *